United States Patent [19]
Yokoyama et al.

[11] Patent Number: 5,140,486
[45] Date of Patent: Aug. 18, 1992

[54] MAGNETIC RECORDING AND REPRODUCTION

[75] Inventors: Kenji Yokoyama, Komoro; Akinori Nisizawa, Saku; Jun-ichi Satoh, Saku; Keiji Koga, Saku; Yasumichi Tokuoka, Saku, all of Japan

[73] Assignee: TDK Corporation, Tokyo, Japan

[21] Appl. No.: 612,846

[22] Filed: Nov. 14, 1990

[30] Foreign Application Priority Data

Nov. 16, 1989 [JP] Japan .................................. 1-298390

[51] Int. Cl.⁵ ...................... G11B 5/127; G11B 5/706
[52] U.S. Cl. ...................................... 360/125; 360/135
[58] Field of Search ........................... 360/55, 131-136, 360/125-127

[56] References Cited

U.S. PATENT DOCUMENTS 4,734,810  3/1988  Nakayama et al. .................. 360/135

FOREIGN PATENT DOCUMENTS 203205  4/1985  European Pat. Off. .
61-248226  11/1986  Japan .

*Primary Examiner*—Robert S. Tupper
*Attorney, Agent, or Firm*—Oblon, Spivak, McClelland, Maier & Neustadt

[57] ABSTRACT

Information is magnetically recorded in and reproduced from a magnetic disk using a flying magnetic head. The disk is a coating type disk comprising a rigid substrate having a magnetic layer coated thereon from a magnetic coating composition of ferromagnetic submicron particles in a binder. High density recording is possible when the magnetic layer having a coercive force of at least 1100 Oe and a thickness of up to 0.5 μm is combined with the flying magnetic head whose gap adjoining portion is made of a soft magnetic material having a saturation magnetic flux density of at least 0.7 T.

5 Claims, 3 Drawing Sheets

MAGNETIC RECORDING AND REPRODUCTION

This invention relates to a process for magnetically recording and reproducing information in magnetic hard disks using flying magnetic heads.

BACKGROUND OF THE INVENTION

Magnetic recording/reproducing equipment for computers or the like generally drives a magnetic disk of the hard type having a magnetic layer on a rigid substrate relative to a flying magnetic head for magnetic recording/reproducing purposes.

Most magnetic hard disks used in the past were of the coating type in which a magnetic coating composition containing magnetic powder and a binder is applied onto a substrate to form a magnetic layer. The magnetic powder used in magnetic disks of the coating type is most often $\gamma$-$Fe_2O_3$ magnetic powder. In turn, the flying magnetic heads used for the recording/reproduction of coating type magnetic disks include ferrite magnetic heads of the monolithic and composite types and thin film type magnetic heads. However, it is difficult to substantially increase the recording density of such disks even when combined with high performance magnetic heads because $\gamma$-$Fe_2O_3$ magnetic powder has a coercive force as low as 300 to 800 oersted (Oe).

To meet a demand for increasing the capacity of magnetic disks, magnetic disks of the thin film type now find increasing use. The thin film type magnetic disks have magnetic thin films, also known as continuous thin films, which are formed by such techniques as sputtering and plating and feature excellent electromagnetic properties and an increased recording density.

The thin film type magnetic disks most often use modified substrates including aluminum alloy substrates having an Ni—P undercoat layer plated thereon or a hard oxide layer formed by anodization. A Cr under layer, a metallic magnetic layer such as a Co—Ni layer, and a protective lubricant layer of carbon or the like are consecutively deposited on the substrate by sputtering.

Despite excellent electromagnetic properties and high density recording capability, the thin film type magnetic disks suffer from the problem that the magnetic layer is less durable and prone to failure upon repetitive contact-start-and-stop (CSS) cycles because it has increased surface energy and low hardness and is difficult to apply a lubricant layer thereon. Also, a reliability problem arises because adhesion or seizure often occurs between the disk and the head as a result of increased friction therebetween. These problems become significant as the flying height of the flying head, that is, the spacing between the magnetic disk surface and the opposing surface of the flying magnetic head is reduced.

Another problem of the thin film type magnetic disks is economy in that the magnetic layers are generally made of expensive materials and require costly equipment such as a vacuum vessel for their formation. For example, the cost for the materials and equipment for the manufacture of Co—Ni thin film type magnetic disks is approximately 2 to 10 times that for coating type magnetic disks. Further, because of the multiple layered structure, the thin film type magnetic disks require a complex, time-consuming film forming process and are rather less adapted for efficient, mass scale production, leading to a further increase of cost. For example, the formation of thin film type magnetic layers by sputtering takes a longer time by a factor of at least about 10 than the formation of coating type magnetic layers by spin coating.

SUMMARY OF THE INVENTION

Therefore, an object of the present invention is to provide a reliable magnetic recording and reproducing process using a low cost magnetic disk adapted for efficient production which enables high density recording.

The present invention which accomplishes this and other objects provides a process for magnetically recording and reproducing information in a magnetic disk using a flying magnetic head. The magnetic disk includes a rigid substrate and a magnetic layer formed thereon by coating a magnetic composition containing ferromagnetic, preferably metallic, submicron particles. According to the feature of the present invention, the magnetic layer has a coercive force of at least 1100 Oe and a thickness of up to 0.5 $\mu$m. The flying magnetic head defining a gap has at least a gap adjoining portion made of a soft magnetic material having a saturation magnetic flux density of at least 0.7 T.

Preferably, the flying magnetic head is at a spacing of up to 0.2 $\mu$m from the disk during operation. The flying magnetic head is either a metal-in-gap type or thin film type magnetic head.

Since the magnetic disks used in the practice of the invention have magnetic layers of the coating type, they are less costly, efficient to manufacture, fully durable in CSS cycles, and free of adhesion to flying magnetic heads. The limitation of the coercive force and thickness of coating type magnetic layers to within the specific ranges and the flying height of the associated flying head to within the specific range leads to high density recording ability and promises excellent overwrite ability. The overwrite ability used herein is evaluated by the retention of a preceding signal after writing a subsequent signal over the preceding signal, for example, the attenuation of 1 F signal (1.65 MHz) after writing 2 F signal (3.3 MHz) thereover.

BRIEF DESCRIPTION OF THE DRAWINGS

The above and other objects, features, and advantages of the present invention will be better understood from the following description taken in conjunction with the accompanying drawings, in which.

DESCRIPTION OF THE PREFERRED EMBODIMENTS

Magnetic Disk

Figure 1:
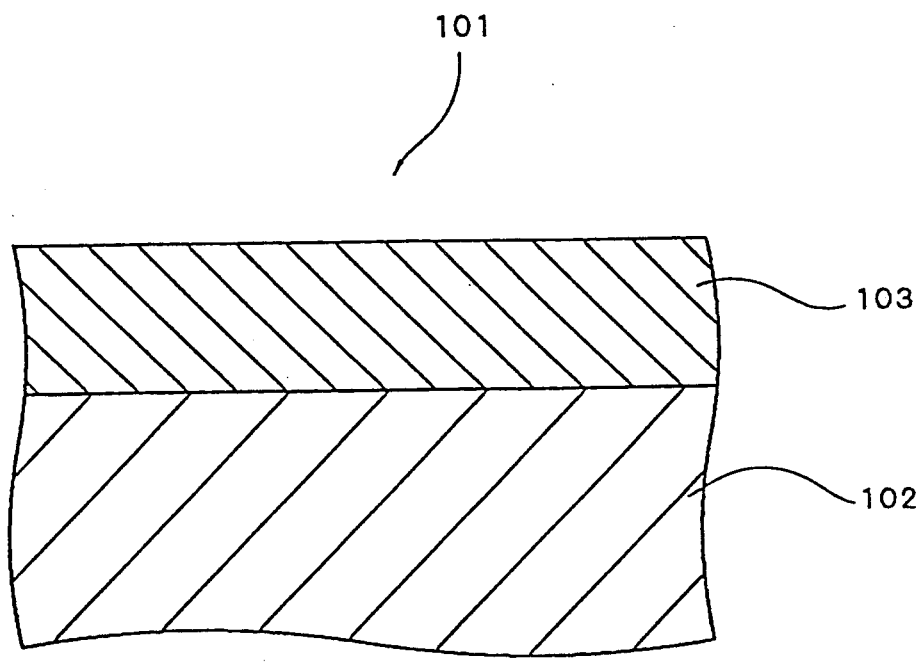
FIG. 1 is a fragmental cross section of a magnetic disk used in the present invention.

Referring to FIG. 1, there is illustrated in cross section a portion of a magnetic disk 101 used in the practice of the present invention. The magnetic disk 101 includes a rigid substrate 102 which supports a magnetic layer 103 coated thereon.

The magnetic disks used in the practice of the present invention encompass both magnetic disks of the one side recording type in which a magnetic layer is formed solely on one surface of a rigid substrate and magnetic disks of the double side recording type in which a magnetic layer is formed on either surface of the rigid substrate.

The disk-shaped rigid substrates used herein may be formed of any desired non-magnetic materials including metals such as aluminum and aluminum alloys and glass, ceramics, and engineering plastics. Aluminum and aluminum alloys are preferred among others because of mechanical rigidity and ease of processing. The rigid substrates may have any desired dimensions depending on a particular application, although they usually have a thickness of about 0.8 to about 1.9 mm and a diameter of about 60 to about 130 mm.

The magnetic layer is formed on the substrate by applying thereto a magnetic coating composition containing ferromagnetic submicron particles, preferably ferromagnetic metal submicron particles.

According to the invention, the magnetic layer should have a coercive force of at least 1,100 Oe. Magnetic layers with a lower coercive force do not exhibit enough electromagnetic properties to achieve high density recording or to reproduce high outputs. It is desired that the coercive force of the magnetic layer be selected so as to provide satisfactory overwrite ability for any magnetic head to be combined therewith. The upper limit of coercive force is generally 2,000 Oe in this sense, though it need not be specified. More preferably, the coercive force of the magnetic layer ranges from 1,200 to 1,500 Oe.

According to the invention, the magnetic layer should have a thickness of up to 0.5 μm. Beyond this thickness limit, no satisfactory overwrite ability is available, saturation recording becomes difficult particularly in the case of short wavelength recording, and an increased thickness loss provides an obstruction against high density recording. The lower limit of the layer thickness need not be specified although 0.05 μm or more is preferred to ensure satisfactory reproduction outputs and S/N ratio. More preferably, the thickness of the magnetic layer ranges from 0.08 to 0.3 μm.

The ferromagnetic submicron particles used in the magnetic layer are not particularly limited insofar as the above-mentioned magnetic properties are obtained. Preferred ferromagnetic submicron particles are ferromagnetic metal submicron particles of elemental Fe, Co and Ni, alloys of two or more of these elements, optionally having incorporated therein an additional element which is selected from Cr, Mn, Co, Ni, Zn, Cu, Zr, Al, Ti, Bi, Ag, Pt, and equivalent elements and mixtures thereof. It is also possible to add a minor amount of a non-metallic element such as B, C, Si, P and N to these metal elements. Also included are partially nitrided metals such as $Fe_4N$.

Further, the ferromagnetic metal submicron particles may have an oxide coating formed on their surface for improving corrosion resistance and weatherability. The oxides used herein include oxides of the metals of which the ferromagnetic particles are made as well as various ceramic oxides such as $Al_2O_3$.

The ferromagnetic metal submicron particles may have any desired shape although needle shape particles offering configurational magnetic anisotropy are preferred. The dimensions of ferromagnetic particles may be selected depending on the construction of an intended magnetic layer although particles having a major diameter or length of about 0.15 to 0.30 μm and an aspect ratio (length to breadth) of from about 6 to about 10 are preferred.

The ferromagnetic metal submicron particles may be prepared by any desired conventional well-known methods, for example, by reducing goethite α-FeOOH. Commercially available particles may also be used.

Other useful ferromagnetic submicron particles include hexagonal oxides such as barium ferrite and strontium ferrite.

The magnetic coating composition used in forming the magnetic layer may be prepared by kneading the ferromagnetic submicron particles and a binder along with a solvent.

The binder used herein is not particularly limited and it may be selected from thermosetting resins, reactive resins, and radiation curable resins, depending on a particular purpose. The thermosetting resins and radiation curable resins are preferred because a thinly applied layer should have satisfactory film strength and high durability.

Some illustrative non-limiting examples of the thermosetting resins include resins of condensation polymerization type such as phenol resins, epoxy resins, polyurethane resins, urea resins, butyral resins, formal resins, melamine resins, alkyd resins, silicone resins, acrylic reactive resins, polyamide resins, epoxy-polyamide resins, saturated polyester resins, and urea-formaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/high molecular weight diol/triphenylmethane triisocyanate, etc.; mixtures of any one of the foregoing condensation polymerization resins and a crosslinking agent such as isocyanates; mixtures of a vinyl copolymeric resin such as a vinyl chloride-vinyl acetate copolymer, a vinyl chloride-vinyl alcohol-vinyl acetate copolymer, a vinyl chloride-vinylidene chloride copolymer, a vinyl chloride-acrylonitrile copolymer, a vinyl butyral copolymer, a vinyl formal copolymer, etc. and a crosslinking agent; mixtures of a cellulosic resin such as nitrocellulose, cellulose acetobutyrate, etc. and a crosslinking agent; mixtures of a synthetic rubber such as butadieneacrylonitrile, etc. and a crosslinking agent; and mixtures of any of the foregoing members.

Particularly preferred are mixtures of an epoxy resin, a butyral resin, and a phenol resin; mixtures of an epoxy resin, polyvinyl methyl ether, and methylol phenol ether as disclosed in U.S. Pat. No. 3,058,844; and mixtures of a bisphenol-A epoxy resin and an acrylate or methacrylate polymer as disclosed in Japanese Patent Application Kokai No. 131101/1974.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives. Other compounds having an unsaturated double bond capable of crosslinking or polymerizing upon exposure to radiation may also be used.

Typical of the resins in the form of thermoplastic resins having contained in their molecule groups capable of crosslinking or polymerizing upon exposure to radiation are unsaturated polyester resins. Included are polyester resins having radiation-sensitive unsaturated double bonds in their molecular chain, for example, unsaturated polyester resins which may be prepared by a standard process of esterifying polybasic acids and polyhydric alcohols, as will be described below in (2), into saturated polyester resins except that the polybasic acids are partially replaced by maleic acid so that the resulting polyesters may have radiation-sensitive unsaturated double bonds.

The radiation-curable unsaturated polyester resins may be prepared by adding maleic acid or fumaric acid to at least one polybasic acid and at least one polyhydric alcohol, conducting dewatering or alcohol-removing reaction in a conventional manner, that is, in a nitrogen atmosphere at 180° to 200° C. in the presence of a catalyst, raising the temperature to 240° to 280° C., and conducting condensation reaction at the temperature under a vacuum of 0.5 to 1 mmHg. The amount of maleic or fumaric acid added may range from 1 to 40 mol %, and preferably from 10 to 30 mol % of the acid reactant in accordance with the crosslinking and radiation curing during preparation.

Examples of the thermoplastic resins which can be modified into radiation-curable resins will be described below.

(1) Vinyl chloride copolymers

Included are vinyl chloride-vinyl acetate-vinyl alcohol copolymers, vinyl chloride-vinyl alcohol copolymers, vinyl chloride-vinyl alcohol-vinyl propionate copolymers, vinyl chloride-vinyl acetate-maleic acid copolymers, vinyl chloride-vinyl acetate-vinyl alcohol-maleic acid copolymers, vinyl chloride-vinyl acetate-OH terminated, alkyl branched copolymers, for example, VROH, VYNC, VYEGX, VERR, VYES, VMCA, and VAGH (all trade names, manufactured by U.C.C.), and analogues. These copolymers may be modified to be radiation sensitive by incorporating acrylic, maleic, or allyl double bonds.

(2) Saturated polyester resins

Included are saturated polyesters obtained by esterifying saturated polybasic acids such as phthalic acid, isophthalic acid, terephthalic acid, succinic acid, adipic acid, sebasic acid, etc. with polyhydric alcohols such as ethylene glycol, diethylene glycol, glycerine, trimethylolpropane, 1,2-propylene glycol, 1,3-butanediol, dipropylene glycol, 1,4-butanediol, 1,6-hexanediol, pentaerithritol, sorbitol, neopentyl glycol, 1,4-cyclohexanedimethanol, etc., and products obtained by modifying these resins with $SO_3Na$ or the like, for example, Vyron 53S (trade name, Toyobo K.K.). They may be modified to be radiation sensitive.

(3) Polyvinyl alcohol resins

Included are polyvinyl alcohol, butyral resins, acetal resins, formal resins, and copolymers of such units. They may be modified to be radiation sensitive by acting on a hydroxyl group in them.

(4) Epoxy resins and phenoxy resins

Included are epoxy resins formed by reaction of bisphenol-A with epichlorohydrin and methyl epichlorohydrin, for example, Epicoat 152, 154, 828, 1001, 1004, and 1007 (trade names, manufactured by Shell Chemicals), DEN 431, DER 732, DER 511 and DER 331 (trade names, manufactured by Dow Chemicals), Epichlon 400 and 800 (trade names, manufactured by Dai-Nihon Ink K.K.); phenoxy resins which are epoxy resins having a high degree of polymerization, for example, PKHA, PKHC, and PKHH (trade names, manufactured by U.C.C.); and copolymers of brominated bisphenol-A with epichlorohydrin, for example, Epichlon 145, 152, 153, and 1120 (trade names, manufactured by Dai-Nihon Ink K.K.). Also included are carboxyl radical-containing derivatives of the foregoing resins. These resins may be modified to be radiation sensitive by using an epoxy group contained therein.

(5) Cellulosic derivatives

A variety of cellulosic derivatives may be used although nitrocellulose, cellulose acetobutyrate, ethyl cellulose, butyl cellulose, acetyl cellulose, and analogues are preferred. These resins may be modified to be radiation sensitive by using a hydroxyl group contained therein.

Additional examples of the resins which can be subjected to radiation sensitive modification include polyfunctional polyester resins, polyether-ester resins, polyvinyl pyrrolidone resins and derivatives (e.g., PVP-olefin copolymers), polyamide resins, polyimide resins, phenol resins, spiro-acetal resins, and acrylic resins containing at least one hydroxyl-bearing acrylate or methacrylate as a polymer component.

Examples of the elastomers and prepolymers are presented below.

(1) Polyurethane elastomers and prepolymers

Polyurethanes are very useful because of abrasion resistance and adhesion to substrates. Illustrative polyurethane elastomers and prepolymers are condensation polymerization products from (a) polyfunctional isocyanates such as 2,4-toluenediisocyanate, 2,6-toluenediisocyanate, 1,3-xylenediisocyanate, 1,4-xylenediisocyanate, 1,5-naphthalenediisocyanate, m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N (trade names, manufactured by Farbenfabriken Bayer A.G.), etc.; and (b) linear saturated polyesters as produced through polycondensation from polyhydric alcohols (such as ethylene glycol, diethylene glycol, glycerine, trimethylol propane, 1,4-butanediol, 1,6-hexanediol, pentaerythritol, sorbitol, neopentylglycol, 1,4-cyclohexanedimethylol, etc.) and saturated polybasic acids (such as phthalic acid, isophthalic acid, terephthalic acid, succinic acid, adipic acid, sebasic acid, etc.); linear saturated polyethers such as polyethylene glycol, polypropylene glycol, and polytetramethylene glycol; caprolactam; polyesters such as hydroxyl-containing acrylates and hydroxyl-containing methacrylates, and the like. It is very useful to react the isocyanate or hydroxyl terminal group of these urethane elastomers with a monomer having an acrylic or allyl double bond to modify them to be radiation sensitive. Also included are those having an OH or COOH group as a terminal polar group.

Also included are monomers having active hydrogen capable of reacting with an isocyanate group and an unsaturated double bond capable of radiation curing, for example, mono- and diglycerides of long chain fatty acids having an unsaturated double bond.

(2) Acrylonitrile-butadiene copolymerized elastomers

Acrylonitrile-butadiene copolymerized prepolymers having a hydroxyl terminal group commercially available as Poly BD Liquid Resin from Sinclair Petro-Chemical and elastomers commercially available as Hiker 1432J from Nihon Zeon K.K. are adequate because the double bond of a butadiene unit is capable of generating a radical upon exposure to radiation to facilitate crosslinking and polymerization.

(3) Polybutadiene elastomer

Low molecular weight prepolymers having a hydroxyl terminal group commercially available as Poly BD Liquid Resin R-15 from Sinclair Petro-Chemical and the like are preferred because they are compatible with thermoplastic resins. R-15 prepolymers whose molecule is terminated with a hydroxyl group can be more radiation sensitive by adding an acrylic unsaturated double bond to the molecule end, which is more advantageous as a binder component.

Also, cyclic products of polybutadienes commercially available as CBR-M901 from Nihon Synthetic Rubber K.K. offer satisfactory quality when combined with thermoplastic resins.

Additional preferred examples of the thermoplastic elastomers and prepolymers include styrene-butadiene rubbers, chlorinated rubbers, acrylic rubbers, isoprene rubbers, and cyclic products thereof (commercially available as CIR 701 from Nihon Synthetic Rubber K.K.) while elastomers, for example, epoxy-modified rubbers and internally plasticized, saturated linear polyesters (commercially available as Vyron #300 from Toyobo K.K.) may also be useful provided that they are subjected to radiation sensitive modification.

The radiation-curable compounds having unsaturated double bonds which may be used as oligomers and monomers in the present invention include styrene, ethylacrylate, ethylene glycol diacrylate, ethylene glycol dimethacrylate, diethylene glycol acrylate, diethylene glycol dimethacrylate, 1,6-hexaneglycol diacrylate, 1,6-hexaneglycol dimethacrylate, N-vinylpyrrolidone, pentaerythritol tetraacrylate (and methacrylate), pentaerythritol triacrylate (and methacrylate), trimethylolpropane triacrylate, trimethylolpropane trimethacylate, polyfunctional oligoester acrylates (e.g., Aronix M-7100, M-5400, 5500, 5700, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of trimethylolpropane diacrylate (methacrylate) phenol ethylene oxide adducts, compounds having a pentaerythritol fused ring represented by the following general formula and having an acryl or methacryl group or epsilon-caprolactone acryl group attached thereto:

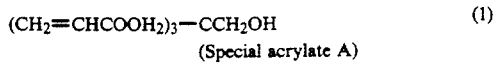
(Special acrylate A)

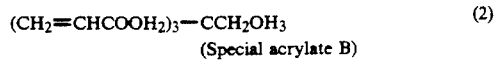
(Special acrylate B)

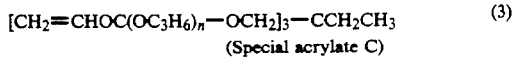
(Special acrylate C)

(Special acrylate D)

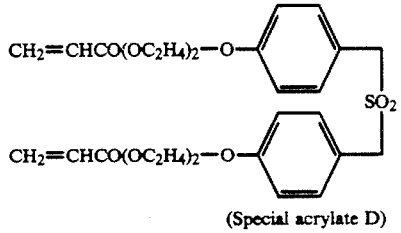

(Special acrylate E)

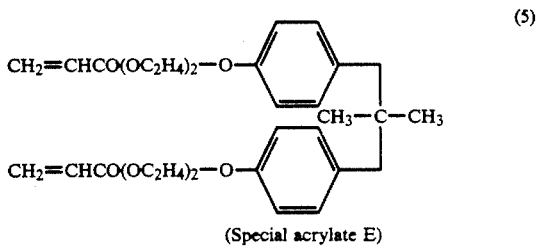

(Special acrylate F)

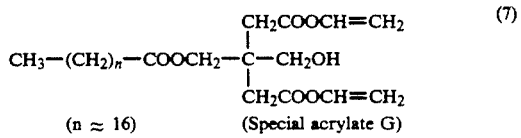
(Special acrylate G)

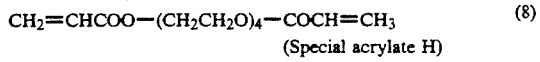
(Special acrylate H)

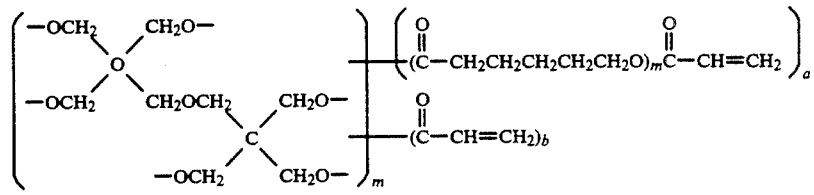

for example, a compound wherein m=1, a=2, and b=4 (special pentaerythritol condensate A), a compound wherein m=1, a=3, and b=3 (special pentaerythritol condensate B), a compound wherein m=1, a=6, and b=0 (special pentaerythritol condensate C), and a compound wherein m=2, a=6, and b=0 (special pentaerythritol condensate D), and special acrylates represented by the following general formulae.

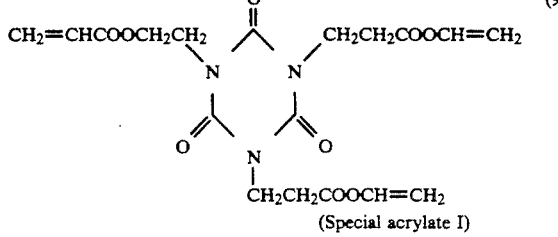
(Special acrylate I)

-continued

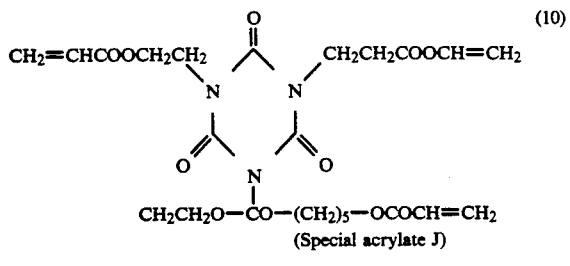

(Special acrylate J)

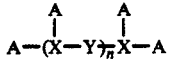

A: acrylic acid  X: polyhydric alcohol
Y: polybasic acid (Special acrylate K)

Among known polymers, polymers of one type degrade while polymers of another type give rise to crosslinking between molecules upon exposure to radiation. Included in the crosslinking type are polyethylene, polypropylene, polystyrene, polyacrylate, polyacrylamide, polyvinyl chloride, polyester, polyvinyl pyrrolidone rubber, polyvinyl alcohol, and polyacrolein. Since these polymers of the crosslinking type give rise to crosslinking reaction without any particular modification as previously described, they may also be used as the radiation-curable binder as well as the above-mentioned modified products.

The proportion of the binder in the magnetic coating composition is not particularly limited although about 20 to about 50 parts by weight of the binder is preferably used per 100 parts by weight of the ferromagnetic submicron particles.

The composition further contains a solvent which is not particularly limited as long as no deleterious effect is exerted. The solvent may be selected from cyclohexanone, isophorone and equivalent solvents depending on the intended application. The proportion of the solvent in the magnetic coating composition is not particularly limited although about 400 to about 700 parts by weight of the solvent is preferably used per 100 parts by weight of the ferromagnetic submicron particles.

The magnetic coating composition may further contain an abrasive such as α-Al$_2$O$_3$, a lubricant such as silicone fluid, and any other additives if desired.

The magnetic coating composition may be applied to the surface of a rigid substrate which has been smoothed as by polishing. The coating method is not particularly limited although spin coating is useful in forming uniform coatings. The conditions of spin coating including revolutions and time may be properly selected depending on the desired thickness.

The application of the magnetic coating composition is followed by orientation of ferromagnetic particles. Preferably, the magnetic coating is subjected to magnetic orientation such that the magnetic particles have their axis of easy magnetization aligned with the circumferential direction of the disk. Such orientation may be accomplished by rotating the magnetic disk between a pair of magnets spaced with their same polarity sides facing each other.

Subsequent to the magnetic orientation, the magnetic coating is subjected to curing for hardening the coating. In the case of thermosetting resin binders, the heating temperature, time and other conditions may be determined depending on a particular type of binder. Usually, the coating is cured by heating at about 150° to 300° C. for about 1 to about 5 hours. In the case of radiation curable resin binders, curing conditions include room temperature and a dose of about 3 to about 10 Mrad. The atmosphere for curing treatment is often an inert gas atmosphere, most often a nitrogen atmosphere.

Subsequent to curing, the magnetic coating is preferably subjected to surface polishing. Various abrasive means such as abrasive tape may be used. The polishing of the magnetic layer is effective in finishing its surface to a desired roughness and adjusting its thickness to a desired value.

Subsequent to polishing, a liquid lubricant is preferably applied to the surface of the magnetic layer such that the layer is impregnated therewith. The type of liquid lubricant is not critical although liquid lubricants based on fluorinated organic compounds are preferred. The liquid lubricant may be applied by any desired method, for example, dipping and spin coating. It will be understood that the liquid lubricant may be directly incorporated in the magnetic coating composition.

Subsequent to the impregnation of liquid lubricant, vanishing is preferably effected to further improve the surface smoothness of the magnetic disk.

Magnetic Head

The flying magnetic head used herein defines a gap in a conventional manner and has at least a gap adjoining portion made of a soft magnetic material having a saturation magnetic flux density of at least 0.7 tesla (T). No limitation is imposed to the remaining components or configuration.

Preferred flying magnetic heads are magnetic heads of the metal-in-gap (MIG) type and magnetic heads of the thin film type.

The MIG type magnetic head includes a pair of cores having opposed surfaces defining a gap therebetween and a soft magnetic thin film having a higher saturation magnetic flux density than the cores disposed on at least one of the gap-defining opposed surfaces. The MIG type magnetic head allows for effective recording on magnetic layers having high coercivity because an intense magnetic flux can be applied across the magnetic layers from the soft magnetic thin film.

Figure 2:
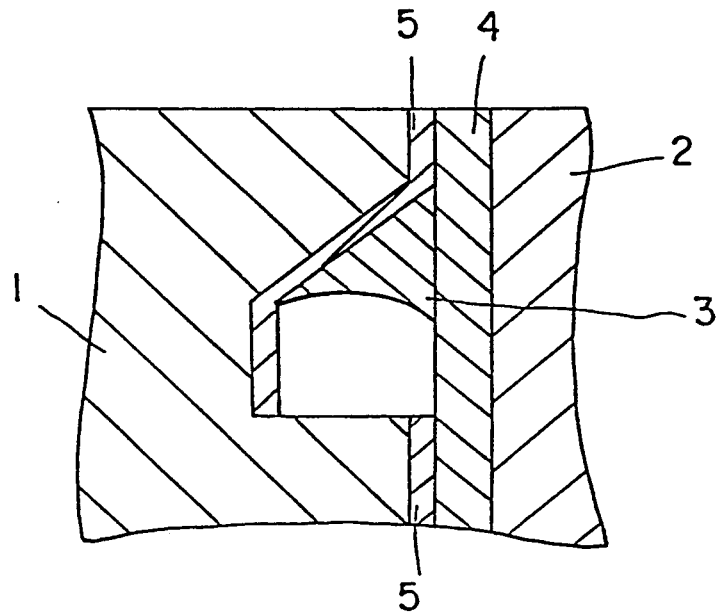
FIGS. 2, 3 and 4 are fragmental cross sections of three different types of MIG magnetic head useful in the present invention.
Figure 3:
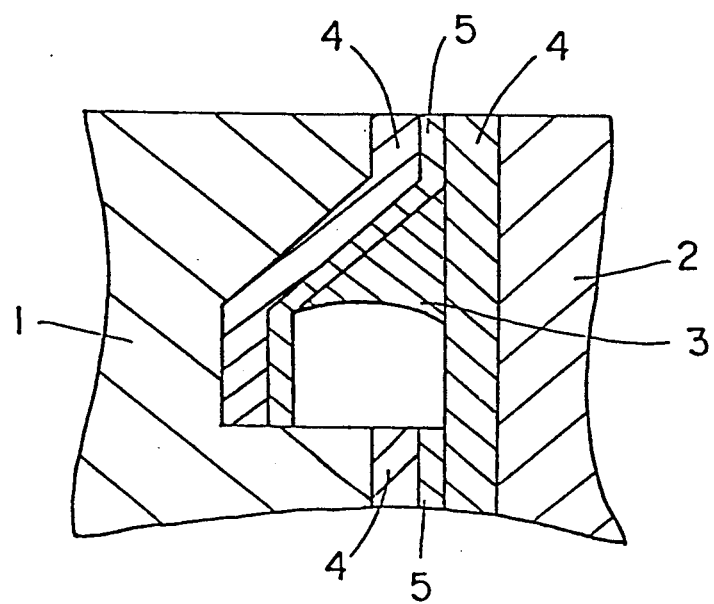

FIGS. 2 and 3 schematically illustrate two preferred embodiments of the MIG type magnetic head used herein.

The magnetic head shown in FIG. 2 includes a pair of first and second cores 1 and 2 having opposed surfaces defining a gap 5 therebetween. A soft magnetic thin film 4 is formed on the gap-defining surface of the second core 2. The cores 1 and 2 are integrally joined through the gap 5 with the aid of a glass fusion weld 3. Where the soft magnetic thin film is disposed solely on one of the cores as in FIG. 2, it is preferred to form the thin film on the trailing core.

The magnetic head shown in FIG. 3 has a soft magnetic thin film 4 on each of the gap-defining opposed surfaces of the first and second cores 1 and 2.

The cores are preferably formed of a ferrite. The ferrite used herein is not particularly limited although a choice is preferably made of an Mn—Zn or Ni—Zn ferrite.

The cores preferably have a saturation magnetic flux density Bs of 0.3 T to 0.6 T. With a saturation magnetic flux density below the range, there is a likelihood that a lowering of overwrite ability might occur and that a lowered Curie temperature might reduce thermal stability. Beyond the range, there is a likelihood that the resulting magnetic head might be adversely affected by increased magnetostriction and tend to be readily magnetized.

Preferably, the cores have an initial magnetic permeability of at least about 1,000 in a DC mode and a coercive force of up to 0.3 Oe.

Preferably, the gap-defining opposed surfaces of the first and second cores 1 and 2 are smoothed as by mirror finishing such that soft magnetic thin films may be subsequently formed thereon with ease.

The soft magnetic thin film 4 used in the MIG type magnetic head has a saturation magnetic flux density Bs of at least 0.7 T. With a saturation magnetic flux density of less than 0.7 T, saturation recording of the magnetic layer having coercivity within the specific range becomes difficult and the overwrite ability becomes unacceptable. Preferably, the thin film has a Bs value of at least 0.8 T. No particular upper limit is needed for the Bs of the thin film although the upper limit of about 2.8 T is commercially imposed because of material composition and manufacture problems.

The soft magnetic thin film 4 may be formed from any desired materials, for example, Fe—Al—Si alloys such as Sendust, Fe—Al—Si—Ni alloys such as Super Sendust, Fe—Si alloys, Ni—Fe alloys such as Permalloy, and Fe—N alloys. The soft magnetic thin film 4 may be a multilayer film consisting of sub layers of these Fe alloys.

The thickness of the soft magnetic thin film 4 is not particularly limited although it is generally 0.2 to 5 $\mu$m thick, preferably 0.5 to 3 $\mu$m thick. With a film thickness below this range, the soft magnetic thin film 4 would have an insufficient overall volume to resist saturation, often failing to perform the function of an MIG type magnetic head. Beyond the range, the soft magnetic thin film 4 would undergo excess abrasion and an increased eddy current loss.

The gap 5 is filled with a non-magnetic material, for example, silicon oxide, preferably $SiO_2$. The gap 5 may be formed by any desired methods, preferably by sputtering. The gap length may be determined in accordance with the recording wavelength although it generally ranges from about 0.2 to about 2.0 $\mu$m.

The first and second cores 1 and 2 are integrally joined through the gap 5, for example, by applying fusion welding glass to form the fusion weld 3. A suitable welding glass may be selected by taking into account various parameters although low melting glasses such as lead silicate glass are preferred because of low operating temperatures.

The MIG type magnetic head may be used either as a flying magnetic head of the monolithic type where the first and second cores serve as a slider or as a flying magnetic head of the composite type where such an MIG type magnetic head is integrally joined with a slider of non-magnetic ceramic such as $Al_2O_3$—TiC.

Figure 4:
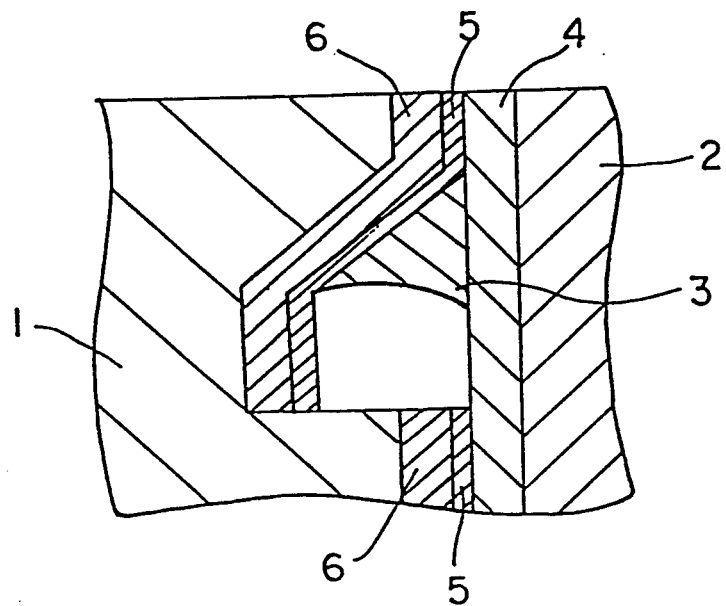

Also useful in the practice of the invention are magnetic heads of the enhanced dual gap length (EDG) type. The EDG type magnetic head is a modified MIG type magnetic head. As shown in FIG. 4, the EDG type magnetic head is the same as the MIG type magnetic head in that it has a pair of cores 1 and 2 and a soft magnetic thin film 4 on the second core 2, but different in that an alloy thin film 6 having a lower saturation magnetic flux density than the cores is formed on the first core 1. The EDG type magnetic head has the same advantages as the aforementioned MIG type magnetic heads and an additional advantage of higher sensitivity provided by the low saturation magnetic flux density alloy thin film. Such low saturation magnetic flux density alloy thin films may be formed from amorphous alloys having a relatively low saturation magnetic flux density as disclosed in U.S. Ser. No. 356,696 filed May 25, 1989.

Another useful magnetic head which can be used herein is a thin film type magnetic head. In general, the thin film type magnetic head has many benefits including high density recording and high speed data transfer.

Figure 5:
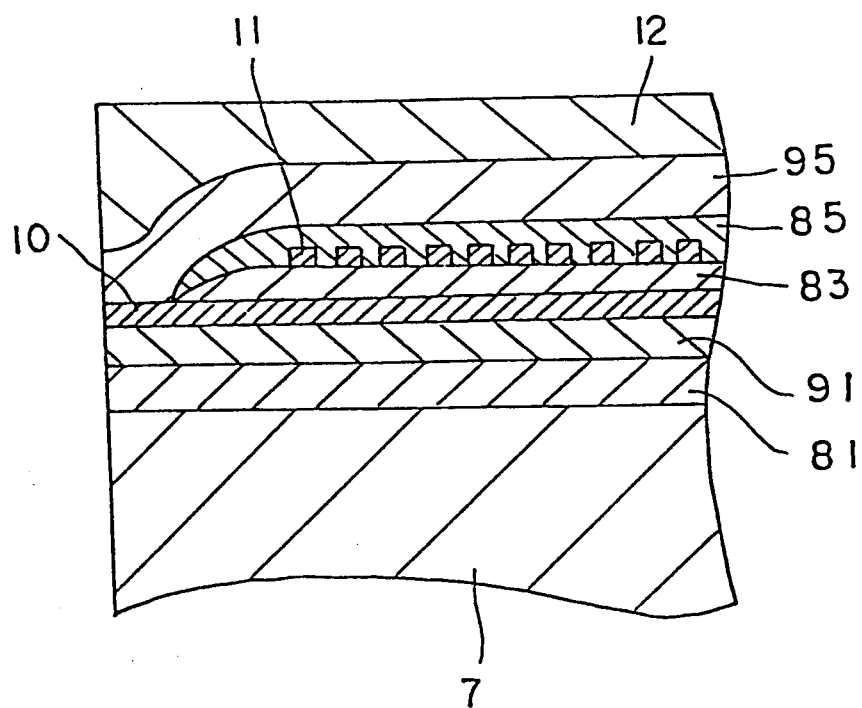
FIG. 5 is a fragmental cross section of a thin film type magnetic head useful in the present invention.

FIG. 5 is a cross section of a portion of a flying magnetic head of the thin film type for use in a preferred embodiment of the present invention. The flying magnetic head includes a slider or base 7, a first insulating layer 81, a lower pole layer 91, a gap layer 10, a second insulating layer 83, a coil layer 11, a third insulating layer 85, and an upper pole layer 95, and a protective layer 12 stacked in this order. The slider 7 and the layers define a flying or air bearing surface at left. A lubricating film may be applied to the flying surface of the head if desired.

The slider 7 may be formed from any well-known materials including ceramics and ferrites. Examples of ceramic materials include $Al_2O_3$—TiC base ceramic materials, $ZrO_2$ base ceramic materials, SiC base ceramic materials, and AlN base ceramic materials. They may contain an additional component(s) such as Mg, Y, $ZrO_2$, and $TiO_2$. The shape and dimensions of the slider 7 may be of conventional design.

The insulating layer 81 may be formed of any conventional well-known materials. For example, $SiO_2$, glass, $Al_2O_3$ and the like may be used if it is desired to form such layers by sputtering. The thickness and pattern of the insulating layer 81 may be of conventional design, and it is 5 to 40 $\mu$m thick, for example.

The magnetic poles are generally provided in the form of lower and upper pole layers 91 and 95 as illustrated in FIG. 5. In the present invention, the lower and upper pole layers 91 and 95 are soft magnetic thin films having a saturation magnetic flux density of at least 0.7 tesla (T) as in the case of the previously mentioned MIG and EDG type magnetic heads. Therefore, these pole layers may be formed from any of the soft magnetic materials previously mentioned in connection with the MIG type magnetic heads. It will be understood that the lower and upper pole layers 91 and 95 may be of the same or different composition. The magnetic pole layers 91 and 95 may be of conventional well-known design with respect to their pattern, thickness and the like. They may be about 1 to 5 $\mu$m thick, for example.

The gap layer or spacer 10 intervenes between the lower and upper pole layers 91 and 95. The gap layer 10 may be formed from any well-known materials including $Al_2O_3$ and $SiO_2$. The gap layer 10 may be of conventional well-known design with respect to its pattern, thickness and the like. It may be about 0.2 to 1.0 $\mu$m thick, for example.

The coil layer 11 may be formed from any desired material, generally from a metal such as aluminum and copper. No particular limits are imposed on the pattern and density of the coil. The coil may be wound in a well-known conventional manner. For example, the coil pattern may be of the spiral type illustrated in FIG. 5, laminate type or zigzag type. The coil layer 11 may be formed by any desired deposition techniques including sputtering, wet plating, and evaporating techniques.

In the illustrated embodiment, the coil layer 11 is spirally disposed between the lower and upper pole layers 91 and 95 while the insulating layers 83 and 85 intervene between the coil layer 11 and the lower and upper pole layers 91 and 95. The insulating layer 81 is disposed between the slider 7 and the lower pole layer 91. These insulating layers may be formed from any well-known materials. For example $SiO_2$, glass, and $Al_2O_3$ may be used when it is desired to form insulating thin films by sputtering.

The protective layer 12 is present on the top of the head, more specifically on the upper pole layer 95. The protective layer 12 may be formed from any well-known materials, for example, $Al_2O_3$. The protective layer 12 may be of conventional well-known design with respect to its pattern, thickness and the like. It may be about 10 to 50 $\mu$m thick, for example. An additional resinous coating may be applied to the protective layer, if desired.

Briefly stated, the process for producing such a thin film type flying magnetic head includes thin film formation and patterning. To form thin films which constitute the respective layers as described above, any well-known vapor phase deposition and wet deposition techniques may be used, for example, vacuum deposition, sputtering, and plating. Patterning of the respective layers of the head may be carried out by selective etching or selective deposition, which are both well known in the art. The etching may be either wet or dry etching.

The flying magnetic head as far described is usually combined with well-known members such as an arm to form a head assembly.

According to the present invention, recording and reproducing operation may be carried out on the magnetic disk by rotating the disk relative to the flying magnetic head while keeping the head afloat. The flying height, that is, the spacing of the flying head away from the disk surface is usually set to at most 0.2 $\mu$m, preferably at most 0.17 $\mu$m. A flying height of more than 0.2 $\mu$m would detract from overwrite ability and fail to achieve a high recording density. It will be understood that the flying height can be minimized until a quasi contact state is established between the floating surface of the magnetic head and the surface of the magnetic disk. The flying height may be adjusted by changing the slider shape, gimbal and suspension loads, disk revolution and other parameters.

The revolution of the magnetic disk during recording/reproducing operation is not particularly limited and may be determined depending on the desired transfer rate, flying height, recording density and the like. The disk is most often rotated at about 1,500 to about 4,000 revolutions per minute (r.p.m.).

In the practice of the invention, digital signals are recorded in a saturation recording mode. The saturation recording enables overwrite recording.

The recording density which can be achieved by the present invention will vary with the coercive force and thickness of the magnetic layer, the gap length and flying height of the flying magnetic head, and other conditions. In most cases, a recording density of at least 30 kFRPI (kilo flux reverse per inch), especially at least 32 kFRPI as expressed in D50 is available. The D50 is a recording density at which an output decreases to 50% of the output of a solitary wave.

In addition, a commercially satisfactory overwrite ability of at most −30 dB is available.

EXAMPLE

Examples of the present invention are given below by way of illustration and not by way of limitation.

Preparation of Coating Magnetic Disks

There were fabricated several magnetic disks D, E, F, G, H, I, J, and K having different magnetic layers coated thereon.

The magnetic powders used in the respective magnetic disks had the composition, coercive force Hc, particle length, and aspect ratio (length/breadth) as shown in Table 1.

TABLE 1

| Magnetic disk | Composition | Magnetic powder Hc (Oe) | Length ($\mu$m) | Aspect ratio |
|---|---|---|---|---|
| D | Co-$\gamma$-$Fe_2O_3$ | 770 | 0.30 | 8 |
| E | $\alpha$-Fe | 1230 | 0.30 | 7 |
| F,G,H,I,J | $\alpha$-Fe | 1340 | 0.25 | 8 |
| K | $\alpha$-Fe | 1500 | 0.20 | 7 |

Magnetic coating compositions were prepared from these magnetic powders by milling and dispersing the following ingredients in a ball mill for 140 hours.

| Ingredient | Parts by weight |
|---|---|
| Magnetic powder | 100 |
| $\alpha$-$Al_2O_3$ | 10 |
| Epoxy resin* | 28 |
| Phenol resin** | 12 |
| Silicone oil | 0.4 |
| Cyclohexanone | 285 |
| Isophorone | 285 |

*Epicoat 1004 available from Shell Chemical K.K.
**Sumilak PC25 available from Sumitomo Bakelite K.K.

The magnetic coating compositions were applied to either surface of disk-shaped aluminum substrates of 3.5 inch diameter by spin coating to a thickness of 1.0 $\mu$m and then, subjected to magnetic orientation in the circumferential direction of the disks using an orientation means having opposed magnets.

The coatings were cured at 200° C. for 3 hours in a nitrogen stream and then polished to the thickness reported in Table 2 by means of a tape abrasion machine using abrasive tape WA4000 available from Nihon Micro-Coating K.K.

The thickness of the magnetic layers was determined from the step between the magnetic layer surface and the exposed surface of a selected substrate area where no magnetic layer was formed, by means of Talistep probe type film thickness meter.

Subsequent to the polishing step, the disks were cleaned and then coated with a Fron solution of 0.1% fluorocarbon (KRYTOX 143CZ available from E. I. DuPont) by dipping for impregnation.

Preparation of Thin Film Magnetic Disks

There were fabricated several magnetic disks L and M with magnetic layers having different coercive forces.

Disk-shaped aluminum substrates of 3.5 inch diameter were coated with an Ni—P undercoat of 20 $\mu$m thick by electroless plating, surface smoothed by means of an abrasive polishing machine, and then cleaned.

Using a magnetron sputtering apparatus, a Cr layer of 0.2 $\mu$m was formed on the undercoat and then a Co—Ni—Cr alloy magnetic layer of 0.05 $\mu$m was formed thereon. The coercive force of the magnetic layer was changed by controlling the substrate heating conditions and Ar gas pressure.

Then a protective carbon film of 0.04 μm thick was formed on the magnetic layer by RF magnetron sputtering. A Fron solution of KRYTOX 143CZ fluorocarbon was applied to the carbon film to form a protective lubricant film.

Preparation of Monolithic Type Flying Magnetic Heads

A magnetic head designated C was manufactured by machining sintered Mn—Zn ferrite blocks having a saturation magnetic flux density of 0.36 T, and joining them with a low-melting glass being fusion welded. The resulting magnetic head core defined a gap filled with $SiO_2$ and having a length of 0.6 μm. The magnetic head core was provided with 24 turns of Cu coil, obtaining a monolithic flying magnetic head. The head was assembled with a gimbal and an arm to complete magnetic head C.

An MIG type magnetic head designated A of the structure shown in FIG. 2 was manufactured by machining a V-shaped groove in a sintered Mn—Zn ferrite block, forming a Sendust film having a saturation magnetic flux density of 1.1 T and a thickness of 2 μm by magnetron sputtering, further machining the block, and following the same procedure as in head C.

Additional MIG type magnetic heads A1 and A2 were manufactured by the same procedure as head A except that the rail configuration of the slider was changed.

The saturation magnetic flux density Bs in proximity to the gap of these magnetic heads are shown in Table 2.

Preparation of Thin Film Type Flying Magnetic Heads

A thin film type magnetic head of the structure shown in FIG. 5 was manufactured by successively stacking an insulating layer 81, a lower pole layer 91, a gap layer 10, an insulating layer 83, a coil layer 11, an insulating layer 85, an upper pole layer 95 and a protective layer 12 on a slider 7. Each layer was formed by sputtering and patterned by dry etching.

The slider 7 was formed of $Al_2O_3$—TiC. The insulating layer 81 was formed of $Al_2O_3$ and 30 μm thick. The upper and lower pole layers 91 and 95 were formed by magnetron sputtering Permalloy having a saturation magnetic flux density of 0.8 T to produce films having a thickness of 1.7 μm and 2.0 μm, respectively. The gap layer 10 was formed of $SiO_2$ and had a gap length of 0.65 μm. The coil layer 11 was spirally formed using Cu. The insulating layers 83 and 85 were formed of $Al_2O_3$. The protective layer 12 was formed of $Al_2O_3$ and 40 μm thick.

Magnetic recording/reproducing operation was conducted on these magnetic disks using these flying magnetic heads in the combination shown in Table 2. They were evaluated as follows.

Tests

Coercive Force

Coercive force was measured under a maximum applied magnetic field of 10 kG using a vibrating sample magnetometer (VSM).

D50

A magnetic disk certifier was used. The recording density was changed by varying the recording frequency. D50 is a recording density at which the peak-to-peak (P—P) value of a reproduced output decreased to 50% of the P—P value of the solitary wave output. The disk was rotated at 3,600 r.p.m. during measurement.

Overwrite Ability

Overwrite ability (O/W) was evaluated by recording a signal having a frequency 1 F of 1.65 MHz in the disk, recording another signal having a frequency 2 F of 3.3 MHz thereover, and measuring the attenuation of 1 F signal by means of a spectrum analyzer (Hughlet Packard). The disk was rotated at 3,600 r.p.m. during measurement.

The recording current was $I_{90} \times 2$ where $I_{90}$ was a recording current value corresponding to 90% of the maximum output of saturation recording.

Coefficient of Friction (μ)

Coefficient of friction was measured according to the ANSI standard with a head load of 15 grams and a relative speed of 5 mm/sec.

CSS Durability

A contact-start-and-stop (CSS) test was carried out using a 3.5" magnetic disk drive available from Plus K.K. One cycle of the CSS test included a quiescent time of 10 sec., a rise time of 5 sec., a steady rotation time of 10 sec., and a fall time of 30 sec. The steady rotation was at 3,600 r.p.m. Measurement was done at a location spaced 22 mm from the disk center. The CSS cycle was repeated until the magnetic layer of the disk was damaged.

The results are shown in Table 2.

The flying height reported in Table 2 was the spacing between the surface of the magnetic disk and the flying surface of the magnetic head at the gap. The flying height was measured by rotating a test quartz disk under the same conditions as for the sample disk in question, thereby causing the magnetic head afloat, directing white light to the gap of the magnetic head from the rear side of the quartz disk, detecting the interference between the reflected light and the reflected light from the disk surface, and calculating the flying height therefrom. For this measurement, an automatic flying height tester available from PPL was used.

TABLE 2

| Combination No. | Magnetic head | | Magnetic disk | | | Flying height (μm) | D50 (kFRPI) | O/W (dB) | μ | CSS (cycle) |
|---|---|---|---|---|---|---|---|---|---|---|
| | Designation | Bs (T) | Designation | Hc (Oe) | Magnetic layer thickness (μm) | | | | | |
| 1 | A | 1.1 | E | 1210 | 0.30 | 0.14 | 32.0 | −35.5 | 0.11 | $>3 \times 10^5$ |
| 2 | A | 1.1 | F | 1310 | 0.11 | 0.14 | 40.0 | −38.5 | 0.12 | $>3 \times 10^5$ |
| 3 | A | 1.1 | G | 1310 | 0.24 | 0.14 | 37.0 | −37.0 | 0.12 | $>3 \times 10^5$ |
| 4 | A | 1.1 | H | 1310 | 0.30 | 0.14 | 36.0 | −35.0 | 0.12 | $>3 \times 10^5$ |
| 5 | A | 1.1 | K | 1430 | 0.30 | 0.14 | 38.5 | −34.0 | 0.11 | $>3 \times 10^5$ |

TABLE 2-continued

| | Magnetic head | | Magnetic disk | | | | | | | |
|---|---|---|---|---|---|---|---|---|---|---|
| | | | | Magnetic layer | | | | | | |
| Combination No. | Designation | Bs (T) | Designation | Hc (Oe) | thickness ($\mu$m) | Flying height ($\mu$m) | $D_{50}$ (kFRPI) | O/W (dB) | $\mu$ | CSS (cycle) |
| 6 | B | 0.8 | H | 1310 | 0.30 | 0.14 | 37.0 | −33.0 | 0.10 | $>3 \times 10^5$ |
| 7 | A1 | 1.1 | H | 1310 | 0.30 | 0.10 | 43.0 | −39.0 | 0.11 | $>3 \times 10^5$ |
| 8 | A2 | 1.1 | H | 1310 | 0.30 | 0.05 | 51.0 | −44.5 | 0.10 | $>3 \times 10^5$ |
| 9* | C | 0.36 | D | 750 | 0.60 | 0.14 | 23.0 | −34.0 | 0.13 | $>3 \times 10^5$ |
| 10* | A | 1.1 | D | 750 | 0.60 | 0.14 | 24.5 | −47.0 | 0.13 | $>3 \times 10^5$ |
| 11* | C | 0.36 | E | 1210 | 0.30 | 0.14 | 26.0 | −27.5 | 0.10 | $>3 \times 10^5$ |
| 12* | A | 1.1 | I | 1310 | 0.60 | 0.14 | 33.0 | −28.0 | 0.12 | $>3 \times 10^5$ |
| 13* | A | 1.1 | J | 1310 | 1.00 | 0.14 | 30.0 | −24.5 | 0.12 | $>3 \times 10^5$ |
| 14* | A | 1.1 | L | 980 | 0.05 | 0.14 | 39.0 | −42.0 | 0.21 | 12000 |
| 15* | A | 1.1 | M | 1310 | 0.05 | 0.14 | 42.0 | −40.5 | 0.23 | 8000 |

*comparison
Note for Table 2:
Head
A, A1, A2: MIG type head
B: thin film type head
C: ferrite head
Disk
D: Co-$\gamma$-$Fe_2O_3$ coated disk
E to K: $\alpha$-Fe coated disk
L, M: Co—Ni—Cr thin film disk
*Combination Nos. 9 to 15 are outside the scope of the invention.

The data of Table 2 demonstrate the benefits of the invention.

More particularly, combination Nos. 1 to 8 in accordance with the invention showed satisfactory results including a D50 of more than 30 kFRPI, an overwrite ability of at most −30 dB, and CSS durability.

In contrast, combination Nos. 9 and 10 using a magnetic disk having coated thereon a Co—$\gamma$—$Fe_2O_3$ base magnetic layer with a lower coercive force showed a low D50 despite satisfactory CSS durability and overwrite ability.

Combination No. 11 using a head with a low Bs was poor in both D50 and overwrite ability.

Combination Nos. 12 and 13 where the magnetic layers were in excess of 0.5 $\mu$m thick showed unacceptable overwrite ability.

Combination Nos. 14 and 15 using thin film type magnetic disks were least durable in CSS due to an increased coefficient of friction.

Further tests were carried out on the same combinations as Nos. 1 to 8 except that the flying height was in excess of 0.20 $\mu$m, finding a loss of D50 and overwrite ability.

It is thus evident that the present invention provides a magnetic recording/reproducing process capable of high density recording in a reliable manner at a low cost.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. In a process for magnetically recording and reproducing information in a magnetic disk comprising a rigid substrate and a magnetic layer formed thereon by coating a magnetic composition containing ferromagnetic submicron particles while rotating the disk relative to a flying magnetic head defining a gap,
   the improvement wherein said magnetic layer having a coercive force of at least 1100 Oe and a thickness of up to 0.5 $\mu$m, and
   said flying magnetic head having at least a gap adjoining portion made of a soft magnetic material having a saturation magnetic flux density of at least 0.7 T.

2. The process of claim 1 wherein said flying magnetic head is at a spacing of up to 0.2 $\mu$m from said disk during operation.

3. The process of claim 1 wherein said ferromagnetic submicron particles are ferromagnetic metal submicron particles.

4. The process of any one of claims 1 to 3 wherein said flying magnetic head is a metal-in-gap type magnetic head.

5. The process of any one of claims 1 to 3 wherein said flying magnetic head is a thin film type magnetic head.

* * * * *